July 30, 1929.  F. S. KOCHENDORFER ET AL  1,722,380
MOLD HANDLING MECHANISM
Filed Feb. 8, 1926   4 Sheets-Sheet 4
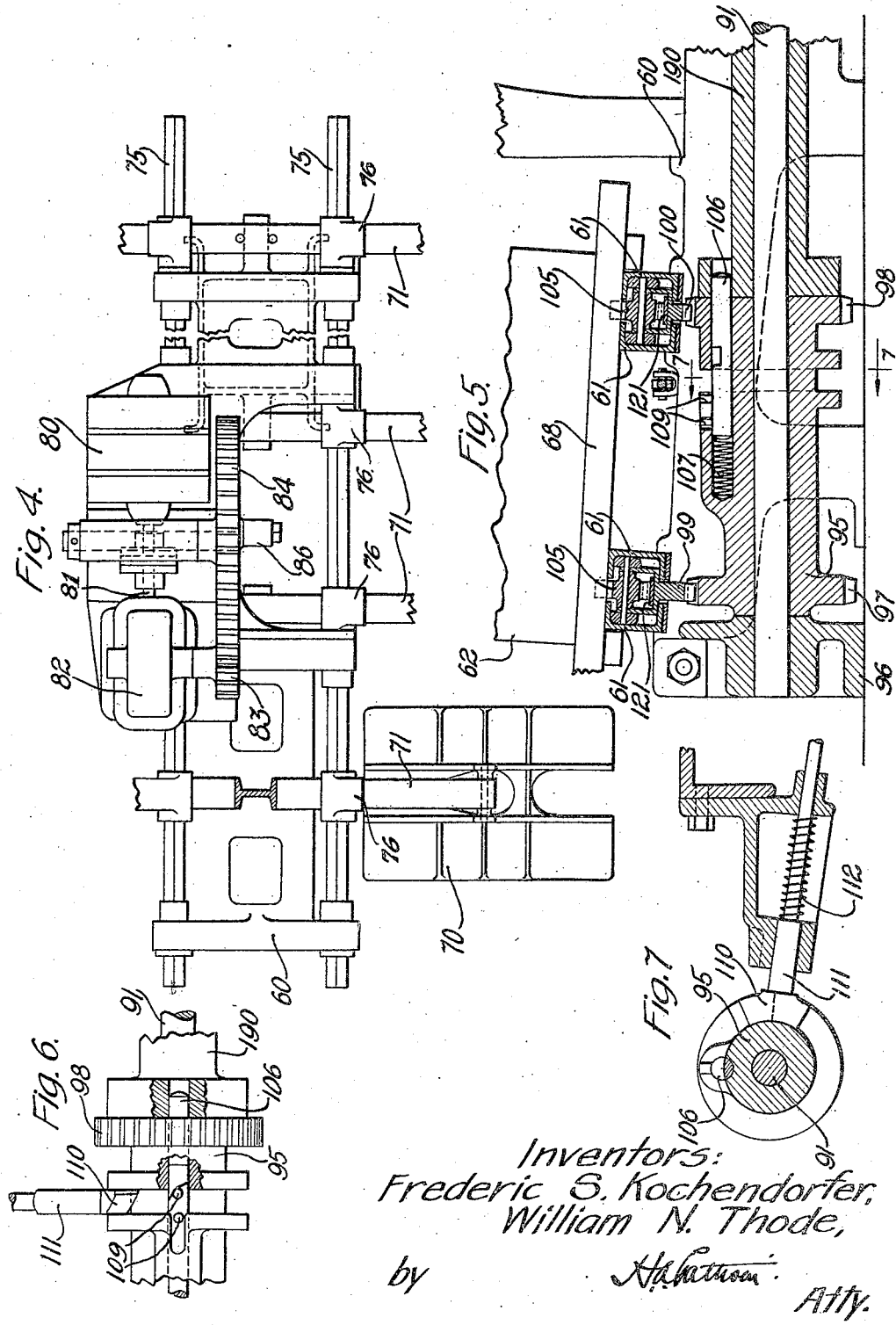
Inventors:
Frederic S. Kochendorfer,
William N. Thode,
by
Atty.

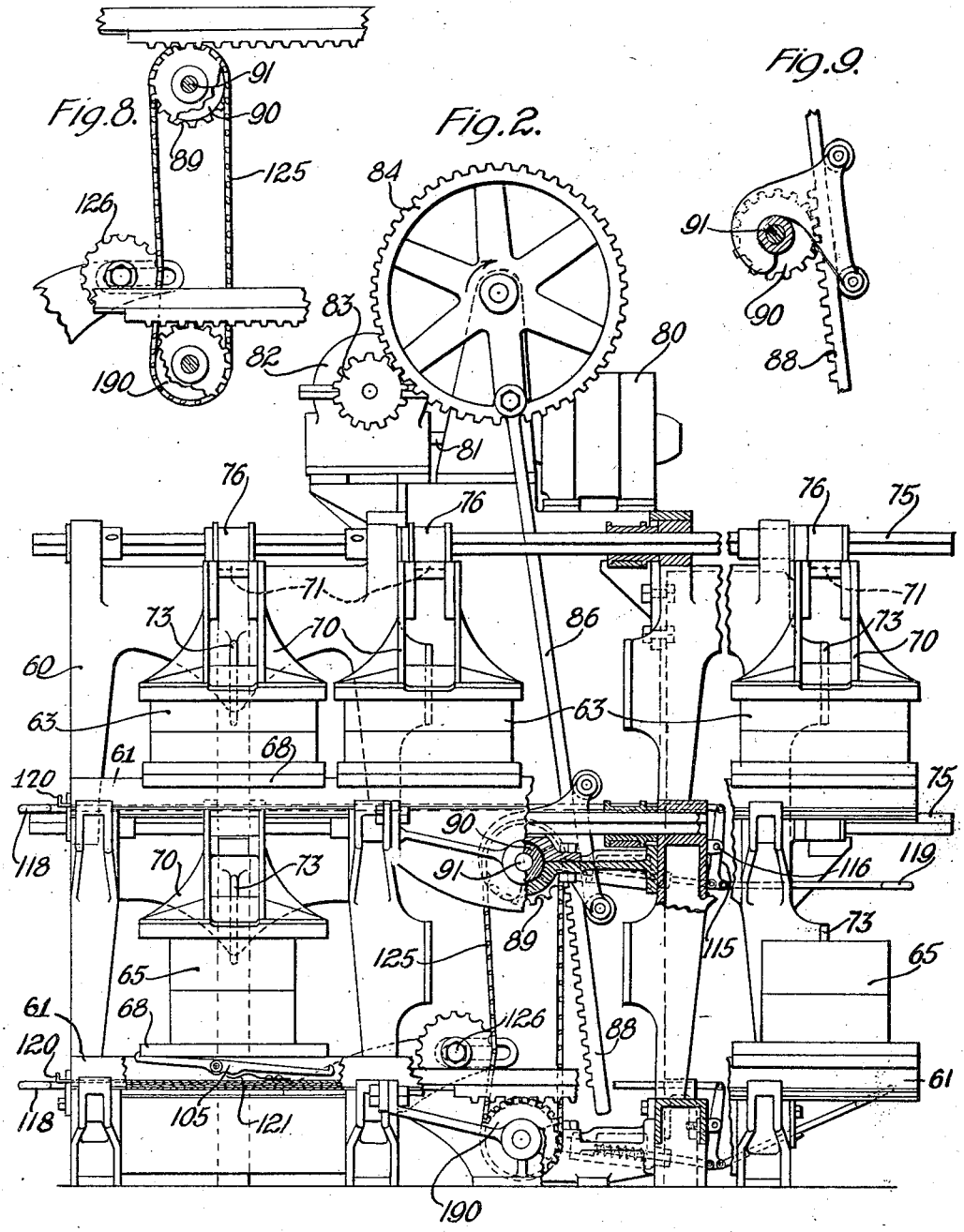

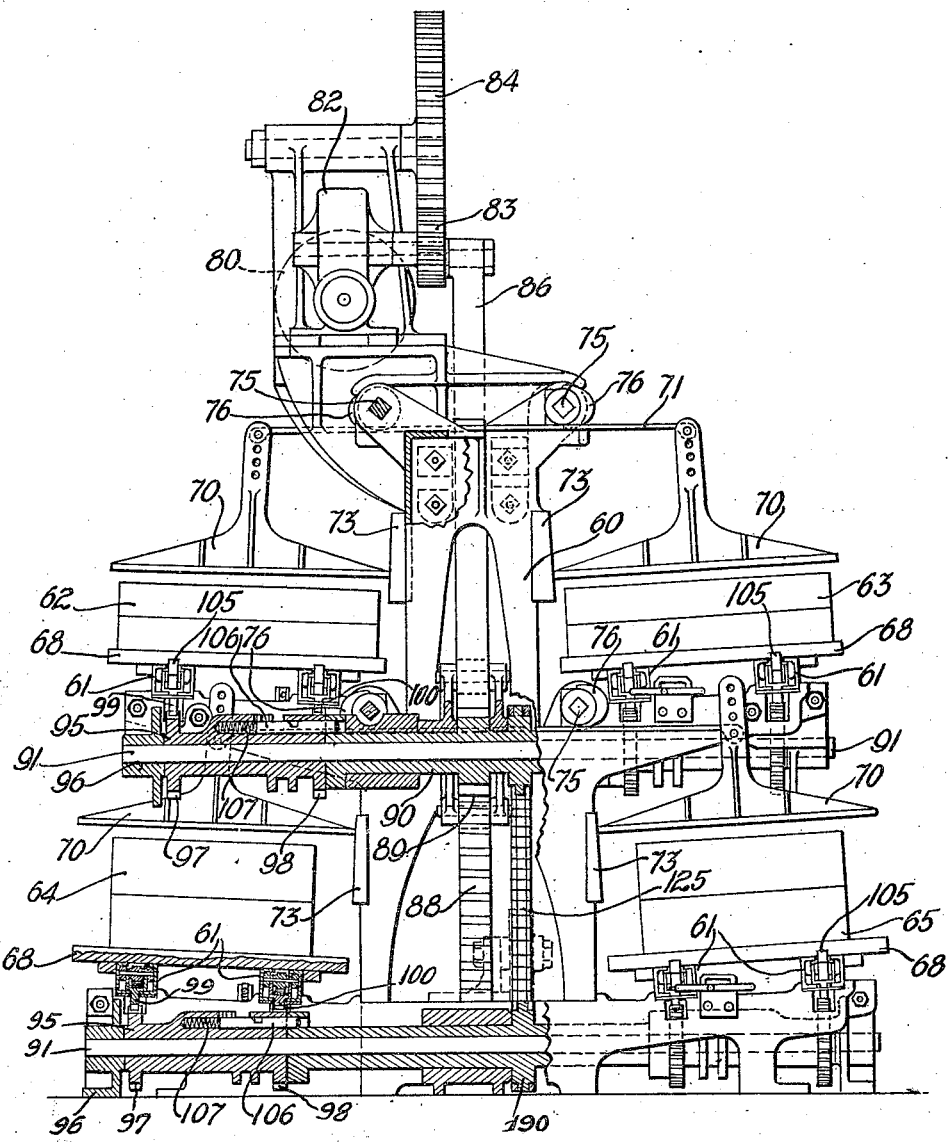

Patented July 30, 1929.

1,722,380

UNITED STATES PATENT OFFICE.

FREDERIC SHIELDS KOCHENDORFER, OF RIVER FOREST, AND WILILAM NICHOLAS THODE, OF CHICAGO, ILLINOIS, ASSIGNORS TO WESTERN ELECTRIC COMPANY, INCORPORATED, OF NEW YORK, N. Y., A CORPORATION OF NEW YORK.

MOLD-HANDLING MECHANISM.

Application filed February 8, 1926. Serial No. 86,702.

This invention relates to mold handling mechanisms for use in a foundry system.

The principal object of the present invention is to provide a mold handling mechanism of such a construction that the preparation and handling of molds may be accomplished expeditiously and efficiently, in a small amount of space and with a minimum of manual labor.

One embodiment of the invention contemplates the provision of a mold handling mechanism consisting of a plurality of channels for supporting a plurality of molds in tiers and having therein racks carrying pivoted members for engaging the molds. The racks are intermittently driven in a reciprocatory movement by pinions connected to oscillating driving gears through manually operated clutches individual to each tier, whereby the pivoted members engage the molds and move them a predetermined distance upon the channels. By means of the manually operated clutches and shifting rods for tilting the pivoted members, each tier of molds can be independently controlled and reversed in direction of movement.

Other objects and features of the invention will become apparent in the consideration of the following detailed description taken with the accompanying drawings, wherein Fig. 1 is a diagrammatic representation of the layout of one section or unit of a foundry system which includes the mold handling mechanisms of the present invention;

Fig. 2 is a fragmentary side elevational view of the mold handling machine employed in connection with the foundry system, parts of the view being shown in section to more clearly illustrate features thereof;

Fig. 3 is a front elevational view of the mechanism shown in Fig. 2, part of the view being shown in section to more clearly illustrate the features thereof;

Fig. 4 is a fragmentary plan view of the mechanism shown in Fig. 2;

Fig. 5 is an enlarged sectional view of a portion of the mechanism shown in Fig. 3;

Fig. 6 is a fragmentary plan view partially cut away of a part of the mechanism shown in Fig. 5;

Fig. 7 is a sectional view taken on the line 7—7 of Fig. 5;

Fig. 8 is a fragmentary detailed view of a portion of the apparatus shown in Fig. 2;

Fig. 9 is a fragmentary detailed view of another portion of the mechanism shown in Fig. 2;

Fig. 10 is an enlarged view of a portion of the mechanism shown in Fig. 3, a portion of the view being shown in section in order to disclose parts otherwise hidden, and Fig. 11 is a fragmentary sectional view taken on the line 11—11 of Fig. 10 looking in the direction of the arrows.

Figure 1:
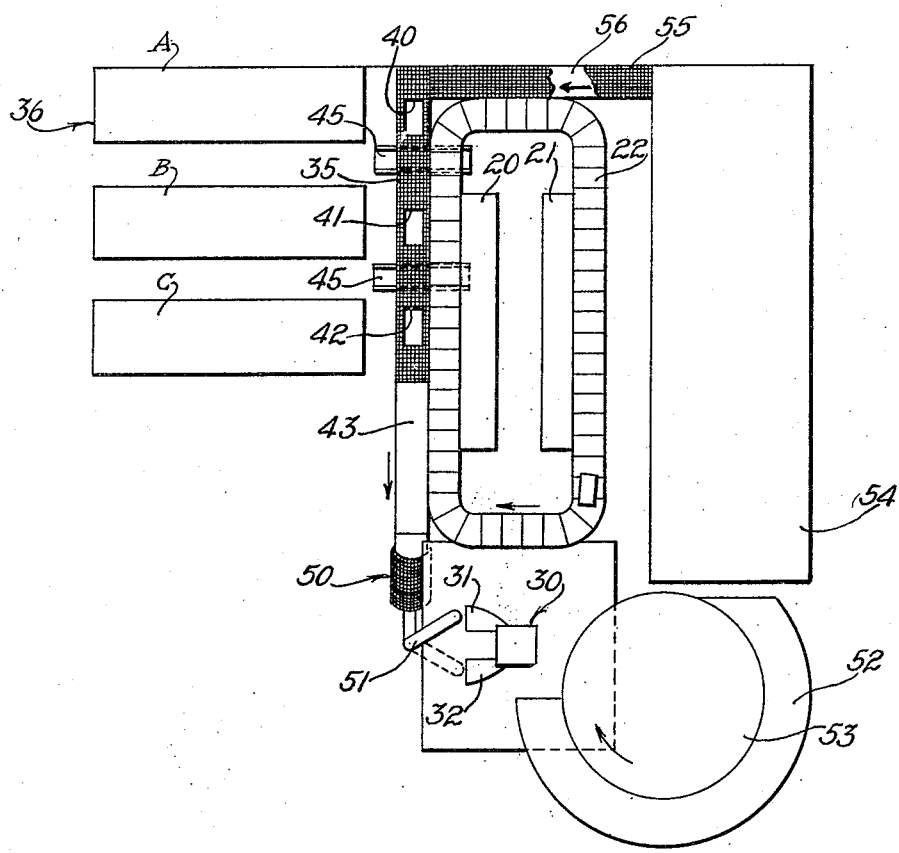

Referring now to the accompanying drawings in which like numerals are employed to designate similar members throughout the several views, a pair of molders' benches shown schematically in Fig. 1 and indicated by the numerals 20 and 21 are enclosed by a conveyor 22 travelling in a closed rectangular path. Positioned at a convenient point along the conveyor, preferably at one end thereof, is a mold filling machine designated generally by the reference numeral 30, provided with a pair of hoppers 31 and 32 for holding different types of molding sand. The mold filling machine is therefore designed so that it can be used to fill various types of molds employing different grades of sand, continuity of operation being assured by the location of the hoppers. Located close to the conveyor 22 and within easy reach of the molders is a stationary table 35 provided with a plurality of openings 40, 41 and 42. A conveyor 43 of any suitable type is positioned below the table 35 and is designed to convey sand and the like, to a sand reconditioning and handling device designated generally by the numeral 50, this device being equipped with a sand elevator 51 designed to discharge sand into either of the hoppers 31 and 32. Mold handling machines designated generally by the numeral 36 are placed in a convenient position opposite the table 35. One or any number of these machines may be employed and where a number of such machines are used they may be arranged in positions indicated by the characters A, B and C in Fig. 1. The machines 36 are shown more in detail in Figs. 2 and 3 and are designed to receive and position the molds after they have been prepared by the molders and the molds are "filled" or "poured" while they are in position in this machine. When the castings have solidified the molds are dumped through one of the openings 40, 41 and 42 in the table 35 and the sand and castings are conveyed to the machine 50, which will be described more in detail hereinafter, floor boards and flasks being then returned to the molders through suitable chutes 45.

The portion of the unit heretofore described is of greatest utility when handling comparatively small molds, and it will be described more in detail hereinafter in a description of the operation of the system after the details of the mold handling machine 36 have been described. For the handling of large molds a circular molder's bench 52 is provided positioned around a rotary table 53. A large apron conveyor 54 is positioned so as to be convenient to one portion of the table 52 and is designed for the storing and filling of large molds. At the end of the conveyor 54 is positioned a heavy screen 55 under which is a conveyor 56 designed to convey material and deposit it on the conveyor 43.

The mold handling machine 36 is shown more in detail in Figs. 2 to 11 inclusive and reference may be had to these figures during the following detailed description of this portion of the foundry system. Referring now particularly to Figs. 2 and 3, the numeral 60 designates the main frame of the mold handling machine to which is secured a plurality of channel irons 61—61 for supporting a plurality of rows of molds 62, 63, 64 and 65 (Fig. 3). The molds are positioned on the usual floor boards designated in each instance by the numeral 68. Each mold station is provided with a mold engaging member or clamping plate 70 supported by a leaf spring 71 and guided by a projection 73 of the frame 60. A rotatable shaft 75 is provided with an eccentric 76 for each leaf spring 71 so that rotation of the shaft 75 causes the eccentrics 76 to depress the leaf springs 71 causing the mold engaging member 70 to engage the row of molds 62, 63, 64 or 65, as the case may be. The purpose of the member 70 is to prevent the separating of the molds during the pouring or filling thereof.

The machine is designed so that the molds may be placed at one end of the channel supports 61 and conveyed therealong to distribute the same in various positions beneath the member 70. The apparatus associated with each mold station to accomplish this result is practically identical and in order to simplify the description, reference will be made to one unit or line of mold stations and the portions of the apparatus which are general to the whole machine. The motive power is supplied by an electric motor 80 (Fig. 2) which transmits motion through a shaft 81 and gears (not shown) provided in a housing 82 to a pinion gear 83 meshing with a larger gear 84. A rod 86 is secured at one end to the gear 84 and is provided with a rack 88 which engages a gear portion 89 on a sleeve 90 (Fig. 3), rotatably positioned on a bearing shaft 91. It is clear that the mechanism hereinbefore described will cause an oscillation of the sleeve 90.

A mold advancing sleeve 95 while positioned on the bearing shaft 91 is secured by a retaining member 96 and is provided with a pair of gears 97 and 98 meshing with racks 99 and 100 respectively, which racks are positioned between pairs of channel irons 61 and extend the whole length of the machine. At each mold position a mold floor board engaging member 105 is pivotally secured to each one of the racks 99 and 100 (Fig. 2).

The member 95 is adapted to be rotated by the sleeve 90 by a clutch mechanism shown in an engaged position in Figs. 5, 6 and 7 which will now be described. One side of the mold advancing sleeve contains an elongated passageway in which is positioned a plunger 106 actuated by a compression spring 107 and provided with a notched portion, as shown particularly in Fig. 5, and a pair of guiding pins 109 which are adapted to slide in a slotted portion in the mold advancing sleeve 95, this slotted portion being shown clearly in Fig. 6. Normally the plunger 106 is maintained out of engagement with an aperture provided in the sleeve 90 by a wedge-shaped retaining plug 110 secured to a rod 111 and held in a position against the mold advancing sleeve 95 and in a peripheral groove therein by the force of a compression spring 112. The rod 111 is secured on a rocker arm 115 (Fig. 2) which is pivoted at 116 and has secured thereto control rods 118 and 119 so that the member 110 can be moved from either end of the machine. When the retaining plug 110 is removed from engagement with the plunger 106, this plunger moves forward against the sleeve 90 until the plunger aperture provided in the sleeve 90 is opposite the plunger, whereupon the plunger enters this aperture and effects an engagement between the members 90 and 95. It will be recalled that the member 90 is given an oscillatory motion and this motion is imparted to the member 95 when the clutch hereinbefore described is engaged and, of course, through the gears 97 and 98 causes the racks 99 and 100 and the members 105 carried thereby to be given a reciprocatory movement. The reciprocatory movement of the racks 99 and 100 carrying the mold floor board engaging members 105 with them will move all of the molds on the line with the molds 62, 63, 64 or 65, shown in Fig. 3, depending upon which one of the members 95 has been set in motion. If the member 105 is tilted on its pivot by means of gravitational pull of the heavier side thereof as shown in Fig. 2, the molds would move to the right. A provision, however, is made for moving the molds in an opposite direction, comprising a long shifting rod 120 to which is secured at each mold position a spring 121 which is designed to engage a shoulder on the mold floor board engaging members 105 and tilt them in the opposite direction whereby the molds will be advanced to the left when regarded from the position at which Fig. 2 is viewed.

The mechanism is designed so that the line of molds will be moved one mold station and stop, or continuously move at intervals governed by the reciprocation of the mechanism until the entire line of molds has been advanced to a required position. It is obvious that as long as the plunger is not withdrawn from engagement with the sleeve 90 the molds will continue to be advanced, and as shown particularly in Figs. 10 and 11 this may be accomplished by locking the rod 118 or 119 as the case may be. On the other hand, if the molds are to be advanced one mold position only, the rod 118 or 119, as the case may be, may be positioned as indicated at 122 in Figs. 10 and 11, thus allowing the retaining plug 110 (Fig. 7) to be returned into the peripheral groove in the member 95 (Fig. 6). The member 110 is wedge-shaped as shown clearly in Fig. 6 and is designed to ride against the groove in the plunger 106 and withdraw the plunger from engagement with the sleeve 90. When the plunger has been completely withdrawn, the member 95 ceases to rotate and the motion of the racks 99 and 100 ceases as well. The mechanism is then in position so that further actuation of the levers 118 or 119 will again advance the molds one mold station.

As shown in Figs. 2 and 3, a double tier of molds is provided in the preferred embodiment of the machine and only the sleeve 90 associated with the upper tier of molds is engaged by the rack 88. A driving chain 125, however, is provided to transmit motion from the sleeve 90 to a corresponding sleeve 190 associated with the lower tier of molds, and a chain tensioning device indicated at 126 (Fig. 8) is provided to tension the chain 125. The mechanism associated with the lower tier of molds is substantially identical with that provided for the upper tier of molds.

The operation of the mold handling unit of the improved foundry system is briefly as follows: When the molds have been prepared by the molders at the benches 20 and 21, they are placed on the table 35 where other workmen receive them and place them on the first mold position on the channel members 61 on the first machine positioned at A (Fig. 1). This workman then pulls the handle associated with the tier and row of molds in which he has just placed the prepared mold, and while he is reaching to the table 35 for another newly prepared mold, the mold already placed in position is advanced one mold position. He continues this until that line of molds has been completely filled, whereupon the shaft 75 associated with the row of molds is rotated to cause the various mold engaging members or clamping plates 70 to be depressed against the respective molds. This row of molds is then in a position to pour and the workman continues to place molds on other tiers in the same machine positioned at A until four rows or units of this machine have been filled in the same manner. At any convenient time the molds are poured or filled and when they are cooled sufficiently for the castings to be removed, the workman disengages the mold engaging members or clamping plates 70 from contact with the molds and locks the operating lever associated with the row of molds which he wishes to remove as hereinbefore described, and as each mold is brought to the end of the line of molds it is received by the workmen and the entire contents thereof dumped into which ever one of the openings 40, 41 or 42 is convenient, whereupon the sand and castings from the molds are deposited on the conveyor 43. The floor boards and other permanent portions of the molds are then returned through the chutes 45 to the molders engaged at the benches 20 and 21. The conveyor 43 advances the sand and castings to the sand treating and reconditioning machine 50.

What is claimed is:

1. In a foundry system, a mold handling mechanism comprising a longitudinal support for a plurality of molds, means for advancing the molds in either direction on said support a predetermined distance, a clamping plate independent of the mold support positioned above each mold, and common means for bringing the clamping plates in engagement with the molds.

2. In a foundry system, a mold handling mechanism comprising a longitudinal mold support, a longitudinal member having mold engaging means secured thereto and associated with each mold, and means for imparting a reciprocating motion to the longitudinal member.

3. In a foundry system, a mold handling mechanism comprising a longitudinal support for a plurality of molds, a rack extending beneath the molds having mold engaging means secured thereto, a rotatable sleeve engaging the rack, an oscillating sleeve member, and means for engaging the rotatable sleeve with the oscillating sleeve member to move the molds a distance measured by one oscillation of the oscillating sleeve member.

4. In a foundry system, a mold handling mechanism comprising a longitudinal support for a plurality of molds, a rod having one end secured to the periphery of a rotatable member, means for rotating the member, a sleeve engaging the rod and receiving an oscillating motion therefrom, a rack having mold engaging means secured thereto, and means for imparting the motion of the sleeve to the rack to advance the molds a distance measured by one oscillation thereof.

In witness whereof, we hereunto subscribe our names this 23rd day of January A. D., 1926.

FREDERIC SHIELDS KOCHENDORFER.
WILLIAM NICHOLAS THODE.